(12) United States Patent
Tochigi et al.

(10) Patent No.: US 7,744,686 B2
(45) Date of Patent: Jun. 29, 2010

(54) FROST-PREVENTIVE COMPOSITION

(75) Inventors: Hidefumi Tochigi, Kanagawa (JP); Daijiro Shiino, Hyogo (JP); Kosuke Tsuda, Kanagawa (JP); Akinori Itoh, Tokyo (JP); Hiroshi Mori, Chiba (JP); Masaaki Kume, Tokyo (JP)

(73) Assignees: NOF Corporation, Kanagawa (JP); Chuo Yuka Co., Ltd., Tokyo (JP)

( * ) Notice: Subject to any disclaimer, the term of this patent is extended or adjusted under 35 U.S.C. 154(b) by 85 days.

(21) Appl. No.: 11/910,094

(22) PCT Filed: Mar. 28, 2006

(86) PCT No.: PCT/JP2006/306269

§ 371 (c)(1),
(2), (4) Date: Sep. 22, 2008

(87) PCT Pub. No.: WO2006/106663

PCT Pub. Date: Oct. 12, 2006

(65) Prior Publication Data

US 2009/0085003 A1  Apr. 2, 2009

(30) Foreign Application Priority Data

Mar. 31, 2005  (JP)  ............... 2005-101563

(51) Int. Cl.
*C09K 3/18* (2006.01)
(52) U.S. Cl. ............... 106/13; 252/70; 252/71
(58) Field of Classification Search .............. 106/13; 252/70, 71
See application file for complete search history.

(56) References Cited

U.S. PATENT DOCUMENTS

| | | | | |
|---|---|---|---|---|
| 2,373,727 A | * | 4/1945 | Longhurst et al. ............. 106/13 |
| 2,416,103 A | * | 2/1947 | Lampton et al. ............ 244/134 E |
| 3,705,854 A | * | 12/1972 | Gunning ..................... 252/70 |
| 3,711,409 A | * | 1/1973 | Ayres et al. .................... 252/70 |
| 4,358,389 A | * | 11/1982 | Konig-Lumer et al. ....... 252/70 |
| 4,585,571 A | * | 4/1986 | Bloom ......................... 252/70 |
| 5,772,912 A | * | 6/1998 | Lockyer et al. ................ 252/70 |
| 5,817,252 A | * | 10/1998 | Hu et al. ....................... 252/70 |
| 5,968,407 A | * | 10/1999 | Boluk et al. ................... 252/70 |
| 6,540,934 B2 | * | 4/2003 | Sapienza et al. .............. 252/70 |
| 7,045,076 B2 | * | 5/2006 | Hartley et al. ................. 252/70 |
| 7,208,101 B2 | * | 4/2007 | Hartley et al. ................. 252/70 |

FOREIGN PATENT DOCUMENTS

| | | |
|---|---|---|
| JP | 03-296591 | 12/1991 |
| JP | 09-188869 | 7/1997 |
| JP | 10-103817 | 4/1998 |
| JP | 2001-055562 | 2/2001 |

* cited by examiner

*Primary Examiner*—Anthony J Green
(74) *Attorney, Agent, or Firm*—Antonelli, Terry, Stout & Kraus, LLP.

(57) ABSTRACT

The invention provides a frost-preventive composition which strongly defrosts and melts ice and which prevents frosting for a long period of time and which does not run or sag when applied to a wall surface or the like.

The frost-preventive greasy composition of the invention contains (a) at least one species selected from among glycols, glycol ethers, polyalkylene glycols, polyalkylene glycol derivatives, glycerin, and glycerin derivatives, (b) at least one species selected from among soaps, urea compounds, silica gel microparticles, lecithin, and polysaccharides, (c) at least one metal salt selected from among carboxylic acid metal salts, nitric acid metal salts, phosphoric acid metal salts, metal chlorides, and metal bromides, and (d) at least one species selected from among sorbitan fatty acid esters, polyoxyalkylene sorbitan fatty acid esters, polyoxyalkylene alkyl ethers, castor oil, hydrogenated castor oil, polyoxyalkylene castor oils, and polyoxyalkylene hydrogenated castor oils, in specified proportions, respectively.

10 Claims, No Drawings

FROST-PREVENTIVE COMPOSITION

TECHNICAL FIELD

The present invention relates to a frost-preventive composition which assumes a grease-like consistency, which defrosts and melts ice, and which prevents frosting and adhesion of snow.

BACKGROUND ART

In refrigerating storehouses, inner walls are covered with frost, which is formed from moisture contained in air and objects stored in the storehouses. If such frost is left unremoved, the walls are gradually covered with ice, resulting in a considerable drop in thermal efficiency of the refrigerating storehouses. Therefore, frost and ice must be removed periodically. In order to remove frost and ice, objects in a refrigerating storehouse must firstly be moved to the outside while refrigeration is temporarily stopped, and the defrosting operation is performed manually.

In order to solve the above problems, there have heretofore been proposed chemical compositions for preventing icing; for example, a thickening organic composition formed from water-miscible organic liquid with alumina (Patent Document 1). However, such an organic composition is not suited for use in a refrigerator for storing food, since undesired contact of alumina with food may occur. Another known composition is formed from ethyl alcohol with bentonite, acid clay, abrasive powder, and talc (Patent Document 2). This alcohol-based composition encounters difficulty in maintaining anti-frost effect, since ethyl alcohol readily evaporates. In addition, the aforementioned compositions disclosed in Patent Documents 1 and 2 are formed of a liquid anti-freeze thickened by specific solid additives, and have a problem in that a long-term stable anti-freeze effect cannot be attained due to poor stability of base oil, separation of anti-freeze liquid from the compositions, and a change in consistency of the compositions. Thus, these compositions are different from the composition of the present invention assuming a grease-like consistency (hereinafter referred to as greasy composition).

Still another disclosed composition is a gel material which is formed by mixing an alcohol such as ethylene glycol or propylene glycol with a thickener such as hydroxymethyl cellulose (Patent Document 3) and which exhibits its anti-freeze effect only by the freezing-point-depressing action of the alcohol and other ingredients. Therefore, the composition can be applied to short-term prevention of icing of a front window pane of an automobile but may exhibit unsatisfactory defrosting and anti-freezing effects over a long period of time under severe circumstances found in refrigerating storehouses. Besides the aforementioned compositions, a variety of chemical compositions mainly for melting snow on road surfaces and anti-icing roads have also been proposed. For example, Patent Document 4 discloses an anti-freeze containing a mixture of a C1 to C10 carboxylic acid salt and a water-soluble polyhydric alcohol, a water-soluble polymer, and an inorganic substance. If these anti-freezes are employed for defrosting inner walls of a refrigerating storehouse, their performance must be maintained for at least half a year. However, when actually applied onto a vertical surface, these anti-freezes for the application to road surfaces problematically fall within a short period.

[Patent Document 1] Japanese Kohyo (PCT) Patent Publication No. 1996-506130
[Patent Document 2] Japanese Patent No. 144709
[Patent Document 3] Japanese Patent Application Laid-Open (kokai) No. 2000-328047
[Patent Document 4] Japanese Patent Application Laid-Open (kokai) No. 10-251622

DISCLOSURE OF THE INVENTION

Problems to be Solved by the Invention

An object of the present invention is to provide a frost-preventive composition which strongly defrosts and melts ice and which exhibits frost prevention effect for a long period of time, which does not run or sag when applied onto a wall surface or the like, and which can be employed without any health-related risk in a food freezing compartment or a similar container where food possibly comes in direct contact with the composition.

Means for Solving the Problems

Accordingly, the present invention is directed to (1) a frost-preventive greasy composition, comprising (a) 10.0 to 96.7 mass % of at least one species selected from among a glycol, a glycol ether, a polyalkylene glycol, a polyalkylene glycol derivative, glycerin, and a glycerin derivative, (b) 0.3 to 25.0 mass % of at least one species selected from among a soap, a urea compound, silica gel microparticles, lecithin, and a polysaccharide, (c) 3.0 to 89.7 mass % of at least one metal salt selected from among a metal carboxylate, a metal phosphate, a metal nitrate, a metal chloride, and a metal bromide, and (d) at least one species selected from among a sorbitan fatty acid ester, a polyoxyalkylene sorbitan fatty acid ester, a polyoxyalkylene alkyl ether, castor oil, hydrogenated castor oil, a polyoxyalkylene castor oil, and a polyoxyalkylene hydrogenated castor oil, wherein the amount of the component (d) is 0.1 to 5.2 parts by mass with respect to the total amount of the components (a), (b), and (c) being 100 parts by mass.

Effects of the Invention

The frost-preventive composition of the present invention strongly defrosts and melts ice and exhibits frost prevention effect for a long period of time. Thus, the composition is excellent from the viewpoint of saving energy. Other advantageous features of the composition of the invention include that no running or sagging occurs when the composition is applied onto a wall surface or the like and that the composition can be employed without any health-related risk in a food freezing compartment or a similar container where food possibly comes in contact with the composition.

Best Modes for Carrying out the Invention

The present inventors have investigated application, to a wall surface or the like, of a liquid which defrosts and melts ice and prevents frosting and adhesion of snow, and have found that running or sagging of a frost-preventive composition can be prevented not only by increasing viscosity of the composition liquid but also by making the composition greasy. The present invention has been accomplished on the basis of this finding.

In the frost-preventive composition of the present invention, the component (a) containing a specific metal salt (component (c)) is held in a 3-dimensional network of the component (b), whereby a sufficient amount of moisture can be held for attaining frost prevention effect. The component (d) further stabilizes the structure. Thus, the object of the invention can be attained.

Hereinafter, the aforementioned components (a) to (d) will be described.

[Component (a)]

The component (a) is at least one species selected from among a glycol, a glycol ether, a polyalkylene glycol, a polyalkylene glycol derivative, glycerin, and a glycerin derivative. In the present invention, the component (a) may serve as a base oil.

The component (a) is preferably dissolved in water (100 mL) at 25° C. in an amount of 10 g or more. Having such a solubility, the composition of the invention has a sufficient water-absorbing property, whereby excellent frost prevention effect can be attained.

Examples of the glycol include alkylene glycols such as ethylene glycol, propylene glycol, and butylene glycol; and alkylene glycol oligomers such as diethylene glycol, triethylene glycol, dipropylene glycol, tripropylene glycol, dibutylene glycol, and tributylene glycol. Of these, from the viewpoint of water-solubility and viscosity at low temperature, ethylene glycol, propylene glycol, diethylene glycol, triethylene glycol, dipropylene glycol, and tripropylene glycol are preferred, with propylene glycol and diethylene glycol being more preferred.

Examples of the glycol ether include alkylene glycol alkyl ethers, such as monomethyl ether, dimethyl ether, monoethyl ether, mono-n-propyl ether, mono-isopropyl ether, mono-n-butyl ether, and mono-isobutyl ether of ethylene glycol and propylene glycol; and alkylene glycol oligomer alkyl ethers, such as monomethyl ether, dimethyl ether, monoethyl ether, diethyl ether, mono-n-propyl ether, mono-isopropyl ether, mono-n-butyl ether, and mono-isobutyl ether of diethylene glycol, triethylene glycol, dipropylene glycol, and tripropylene glycol. Of these, from the viewpoint of water-solubility and viscosity at low temperature, the above alkyl ethers of ethylene glycol, propylene glycol, diethylene glycol, triethylene glycol, dipropylene glycol, and tripropylene glycol are preferred, with the above alkyl ethers of propylene glycol and diethylene glycol being more preferred.

Examples of the polyalkylene glycol include ethylene oxide homopolymer and propylene oxide homopolymer; and copolymers formed from ethylene oxide and at least one monomer selected from among propylene oxide, butylene oxide, and tetrahydrofuran. Of these, from the viewpoint of water-solubility and viscosity at low temperature, ethylene oxide homopolymer, propylene oxide homopolymer, and ethylene oxide-propylene oxide copolymer are preferred. The polyalkylene glycol preferably has a molecular weight of 500 or lower.

Examples of the polyalkylene glycol derivative include alkyl ethers and fatty acid esters of the above polyalkylene glycols, and polyoxyalkylene polyhydric alcohols.

Specific examples of the polyalkylene glycol alkyl ethers include monomethyl ether, monoethyl ether, monopropyl ether, monobutyl ether, monohexyl ether, monooctyl ether, monodecyl ether, monododecyl ether, monotetradecyl ether, monohexadecyl ether, monooctadecyl ether, monooleyl ether, monoallyl ether, and monocholesteryl ether of the above polyalkylene glycols. Of these, from the viewpoint of water-solubility and viscosity at low temperature, ethylene oxide homopolymer and ethylene oxide-propylene oxide copolymer which have a molecular weight of 500 or lower are preferred. When the polyalkylene glycol is ethylene oxide-propylene oxide copolymer, the ethylene oxide content is preferably 50 mass % or higher.

Among these alkyl ethers, monomethyl ether, monoethyl ether, monopropyl ether, monobutyl ether, monohexyl ether, monooctyl ether, monodecyl ether, monododecyl ether, and monooleyl ether are preferred, with monomethyl ether, monoethyl ether, monopropyl ether, and monobutyl ether being more preferred.

Specific examples of the fatty acid esters of the polyalkylene glycols include monoacetate, monopropanoate, monobutanoate, monohexanoate, monooctanoate, monodecanoate, monododecanoate, monotetradecanoate, monohexadecanoate, monooctadecanoate, and monooleate of the above polyalkylene glycols. Of these, from the viewpoint of water-solubility and viscosity at low temperature, ethylene oxide homopolymer and ethylene oxide-propylene oxide copolymer having a molecular weight of 500 or lower are preferred. When the polyalkylene glycol is ethylene oxide-propylene oxide copolymer, the ethylene oxide content is preferably 50 mass % or higher.

Among the tatty acid esters, monoacetates, monopropanoates, monobutanoates, monohexanoates, monooctanoates, monodecanoates, and monododecanoates are preferred, with monoacetates, monopropanoates, and monobutanoates being more preferred.

The polyoxyalkylene polyhydric alcohol is an ether formed from of the above polyalkylene glycol and a polyhydric alcohol. Examples of the polyhydric alcohol include glycerin, trimethylolpropane, diglycerin, triglycerin, pentaerythritol, glucose, sucrose, methylglucoside, and sorbitol. From the viewpoint of water-solubility and viscosity at low temperature, the polyalkylene glycol is preferably ethylene oxide homopolymer and ethylene oxide-propylene oxide copolymer having a molecular weight of 500 or lower. When the polyalkylene glycol is ethylene oxide-propylene oxide copolymer, the ethylene oxide content is preferably 50 mass % or higher.

Examples of the glycerin and glycerin derivative include glycerin, diglycerin, polyglycerin, and alkyl ethers and fatty acid esters of glycerin, diglycerin, and polyglycerin.

Specific examples of the alkyl ethers of glycerin, diglycerin and polyglycerin include methyl ether, ethyl ether, propyl ether, butyl ether, hexyl ether, octyl ether, decyl ether, dodecyl ether, tetradecyl ether, hexadecyl ether, octadecyl ether, oleyl ether, allyl ether, and cholesteryl ether of glycerin, diglycerin and polyglycerin. Among these alkyl ethers, from the viewpoint of water-solubility, methyl ether, ethyl ether, propyl ether, butyl ether, hexyl ether, octyl ether, decyl ether, dodecyl ether, and oleyl ether are preferred, with methyl ether, ethyl ether, propyl ether, and butyl ether being more preferred. The percent etherification of the hydroxyl groups in glycerin, diglycerin, or polyglycerin is preferably 50% or lower.

Specific examples of the fatty acid esters of glycerin, diglycerin and polyglycerin include acetate, propanoate, butanoate, hexanoate, octanoate, decanoate, dodecanoate, tetradecanoate, hexadecanoate, octadecanoate, and oleate of glycerin, diglycerin and polyglycerin. Of these, from the viewpoint of water-solubility, acetate, propanoate, butanoate, hexanoate, octanoate, decanoate, and dodecanoate are preferred, with acetate, propanoate, and butanoate being more preferred. The percent etherification of the hydroxyl groups in glycerin, diglycerin, or polyglycerin is preferably 50% or lower.

In the present invention, the component (a) is preferably at least one species selected from among an alkylene glycol, an alkylene glycol oligomer, and glycerin.

Among the compounds of the component (a), diethylene glycol, propylene glycol, and glycerin, each having a low freezing point and high water-solubility, are most preferred from the viewpoint of high frost preventive effect. When the composition of the invention is employed in a place where food may possibly come into contact with the composition (e.g., a food refrigerator or a food freezing compartment), use of propylene glycol or glycerin, whose contact with food is allowed, is preferred.

In the present invention, the component (a) content of the frost-preventive composition is preferably 10.0 mass % or higher, more preferably 15 mass % or higher, still more preferably 30 mass % or higher. A component (a) content lower than 10.0 mass % is not preferred, since sufficient frost-preventive effect can not be attained. The component (a) content of the frost-preventive composition is 96.7 mass % or lower, preferably 90 mass % or lower.

[Component (b)]

The component (b) is at least one species selected from among a soap, a urea compound, silica gel microparticles, lecithin, and a polysaccharide. In the present invention, the component (b) may serve as a thickener.

Examples of the soap include sodium salts, calcium salts, lithium salts, and aluminum salts of higher fatty acids, and complex soaps thereof. The higher fatty acid is preferably a C12-22 higher fatty acid, more preferably a C16-22 higher fatty acid.

The urea compound refers to an organic compound having a urea group (—NH—CO—NH—). Urea compounds each having two or more urea groups are preferred for enhancing thickening effect. Examples of preferred urea compounds include aromatic diureas, aliphatic diureas, alicyclic diureas, triureas, and tetraureas.

The silica gel microparticles employed in the invention are microparticulate porous silica gel. Either hydrous silica gel or anhydrous silica gel may be employed. Preferably, the silica gel microparticles have an average primary particle size of 5 to 20 nm.

The lecithin employed in the invention may be lecithin extracted from soybean, egg yolk, or the like. There may be employed low purity soybean lecithin or egg yolk lecithin, which is a mixture of lecithin and a source oil and fat, or high purity lecithin which has undergone purification for removal of a source oil and fat and other materials for mainly employed in drugs. In the present invention, soybean lecithin is preferably employed.

In the present invention, the polysaccharide refers to a polymer compound having repeatedly linked glycoside bonds and represented by a molecular formula $(C_6H_{10}O_5)_n$. Examples of typical polysaccharides include wheat starch, sweet potato starch, potato starch, corn starch, and soluble starch, as well as starches and celluloses to which a functional group introduced at a hydroxyl group thereof, such as carboxymethyl starch, methyl cellulose, hydroxyethyl cellulose, and carboxymethyl cellulose. In addition, konjac mannan, pectin, agar, funori, alginic acid salts, gum arabi, dextrin, levan, gelatin, casein, collagen, carrageenan, xanthane gum, or the like may be employed as a polysaccharide. In the present invention, refined carrageenan is preferably employed.

When the composition of the invention is employed in a place where food may possibly come into contact with the composition (e.g., a food refrigerator or a food freezing compartment), use of silica gel microparticles, lecithin such as soybean lecithin, a polysaccharide such as refined carrageenan, or a C16 to C22 fatty acid metal salt (e.g., calcium stearate), whose contact with food is allowed, is preferred.

The frost-preventive composition of the present invention has a component (b) content of 0.3 to 25.0 mass %, preferably 0.5 to 20.0 mass %. When the content is in excess of 25.0 mass %, the thickening effect excessively increases, whereby the composition has a higher consistency, and handling of ingredients is difficult. When the content is less than 0.3 mass %, the thickening effect is poor, and grease consistency of the composition is difficult to maintain, resulting in running or sagging of the applied frost-preventive composition. Needless to say, both cases are not preferred. In contrast, when the component (b) content falls within the above range, an appropriate thickening effect is attained, and grease consistency of the composition can be maintained, which is preferred for preventing running or sagging thereof.

[Component (c)]

In the present invention, the component (c) is at least one metal salt selected from among a metal carboxylate, a metal phosphate, a metal nitrate, a metal chloride, and a metal bromide (hereinafter such salts are referred to as "specific metal salts").

Among the specific metal salts, examples of the carboxylic acid metal salt include alkali metal salts and alkaline earth metal salts of a carboxylic acid. Examples of the carboxylic acid include formic acid, acetic acid, lactic acid, malic acid, tartaric acid, propionic acid, butyric acid, oxalic acid, malonic acid, succinic acid, glutaric acid, maleic acid, fumaric acid, citric acid, gluconic acid, and adipic acid, and examples of the alkali metal and alkaline earth metal include lithium, sodium, potassium, magnesium, and calcium. Examples of the metal chloride include magnesium chloride, calcium chloride, lithium chloride, and zinc chloride. Examples of the metal bromide include zinc bromide, calcium bromide, sodium bromide, and lithium bromide. Examples of the metal nitrate include sodium nitrate, potassium nitrate, and calcium nitrate. Examples of the metal phosphate include sodium phosphate and potassium phosphate. When the salt is of divalent or higher, the salt may be a hydrogen acid salt or a double salt. The specific metal salts may be employed singly or in combination of two or more species.

From the viewpoints of safety and other factors, the specific metal salt is preferably a metal carboxylate, a metal citrate, a metal phosphate, a metal nitrate, or a metal chloride.

Specifically, from the viewpoint of safety, the specific metal salt is preferably magnesium acetate, potassium acetate, lithium acetate, sodium acetate, monosodium citrate, disodium citrate, trisodium citrate, monopotassium citrate, dipotassium citrate, tripotassium citrate, calcium citrate, magnesium chloride, calcium chloride, lithium chloride, potassium lactate, sodium lactate, trisodium phosphate, disodium hydrogenphosphate, monosodium dihydrogenphosphate, tripotassium phosphate, dipotassium hydrogenphosphate, monosodium dihydrogenphosphate, or a similar salt.

When the composition of the invention is employed in a place where food may possibly come into contact with the composition (e.g., a food refrigerator or a food freezing compartment), the component (c) is preferably sodium acetate, monosodium citrate, disodium citrate, trisodium citrate, monopotassium citrate, dipotassium citrate, tripotassium citrate, calcium citrate, calcium chloride, sodium lactate, trisodium phosphate, disodium hydrogenphosphate, monosodium dihydrogenphosphate, tripotassium phosphate, dipotassium hydrogenphosphate, monosodium dihydrogenphosphate, or a similar salt.

The component (c) content of the frost-preventive composition is 3.0 to 89.7 mass %. When the content exceeds 89.7 mass %, coatability of the composition to an application object disadvantageously decreases, whereas when the content is less than 3.0 mass %, effects of defrosting and melting ice and preventing frosting and adhesion of snow are impaired. Both cases are not preferred. When the component (c) content falls within the above range, satisfactory coatability can be attained, whereby excellent effects of defrosting and melting ice and preventing frosting and adhesion of snow can be attained. Thus, the component (c) content of the frost-preventive composition is preferably 10.0 to 50.0 mass %, more preferably 10.0 to 40.0 mass %.

[Component (d)]

The frost-preventive composition of the present invention contains a component (d) for stabilizing the grease-like consistency for a long period of time. As mentioned above, the component (d) of the invention serves as a structure-stabilizer for stabilizing the grease consistency. The component (d) preferably has a fatty acid ester structure in order to prevent, for a long period of time, falling off, through running or exfoliation, of the composition applied onto a wall surface or the like, to thereby attain continuous frost preventing effect.

The component (d) is preferably a polyhydric alcohol derivative having a fatty acid ester moiety, or a similar substance. Examples of preferred substances of the component (d) include glycerin fatty acid esters, glycerin fatty acid ester polyoxyalkylene adducts, sugar fatty acid esters, sorbitan fatty acid esters, polyoxyalkylene sorbitan fatty acid esters, polyoxyalkylene alkyl ethers, castor oil, hydrogenated castor oil, polyoxyalkylene castor oil, and polyoxyalkylene hydrogenated castor oil.

In the present invention, among these substances, the compound (d) is preferably a sorbitan fatty acid ester, a polyoxyalkylene sorbitan fatty acid ester, a polyoxyalkylene alkyl ether, castor oil, hydrogenated castor oil, a polyoxyalkylene castor oil, a polyoxyalkylene hydrogenated castor oil, or a similar substance, more preferably, at least one species selected from among sorbitan fatty acid esters, polyoxyalkylene sorbitan fatty acid esters, and polyoxyalkylene hydrogenated castor oil Examples of the sorbitan fatty acid ester include sorbitan monocaprylate, sorbitan monolaurate, sorbitan monomyristate, sorbitan monopalmitate, sorbitan monostearate, sorbitan monooleate, and sorbitan monobehenate.

Examples of the polyoxyalkylene sorbitan fatty acid ester include ethers formed from the above sorbitan fatty acid ester and a polyalkylene glycol. The same polyalkylene glycols as employed in the component (a) may also be employed. Among them, polyethylene glycol is particularly preferred.

The polyoxyalkylene alkyl ether, polyoxyalkylene castor oil, and polyoxyalkylene hydrogenated castor oil are produced from a polyalkylene glycol with an alkyl ether, castor oil, or hydrogenated castor oil. The same polyalkylene glycols as described above may also be employed.

Preferably, the polyoxyalkylene castor oil and the polyoxyalkylene hydrogenated castor oil have a polyoxyethylene content of the polyoxyalkylene of 50 mass % or higher.

The frost-preventive composition of the present invention contains component (d) in an amount of 0.1 to 5.0 mass %; i.e., 0.1 to 5.2 parts by mass with respect to the total amount of the components (a), (b), and (c) being 100 parts by mass. When the component (d) content is 0.1 mass % or more, the effect of stabilizing grease consistency is enhanced, which is preferred. In general, when 5.0 mass % or less of the component (d) is contained in the frost-preventive composition, a target effect can be attained. Therefore, the component (d) content is preferably 5.0 mass % or less from the viewpoint of economy.

If required, the frost-preventive composition of the present invention may further contain a known additive such as an anti-oxidant, an anti-corrosive agent, or a perfume. These additives may be incorporated in the composition generally in an amount of 5 mass % or less, so long as these additives do not impair the frost prevention effect.

The frost-preventive composition of the present invention may further contain, for adjusting viscosity, a solvent such as water or a lower alcohol; e.g., ethanol or isopropyl alcohol. The solvent content of the composition is preferably 70 mass % or less for enhancing frost prevention effect.

In coating, the frost-preventive composition of the present invention may be applied by means of a roller, a trowel, a brush, or a similar tool, sprayed as aerosol, or jetted with compressed air. Since the frost-preventive composition of the present invention has grease consistency to exhibit high thixotropy, flowability of the composition increases during coating, thereby attaining a suitable coating state. After an object of interest has been coated with the composition, the network structure of the component (b) is re-constructed. Therefore, when applied onto a vertical surface, no running or sagging of the composition occurs, which is preferred.

The frost-preventive composition of the present invention can be employed for frost prevention of an inner wall of a freezing storehouse, a cooling apparatus, etc. as well as for snow melting and anti-icing of buildings, vehicles, and electric cables.

When the components (a) to (d) are selected from substances which are allowed to be used as food or a food additive, the frost-preventive composition of the present invention may be suitably used in a place where the composition is in direct contact with food.

EXAMPLES

The present invention will next be described in more detail by way of examples, which should not be construed as limiting the invention thereto.

Example 1

Lithium stearate (65 g), diethylene glycol (830 g), and polyoxyethylene sorbitan monooleate (Nonion OT-221, product of NOF Corporation) (5 g) were heated under stirring at 200° C. for dissolution. After cooling of the mixture, magnesium acetate (100 g) was added thereto, and the resultant mixture was processed by means of a roll mill, to thereby produce a frost-preventive composition.

Example 2

Calcium stearate (110 g), propylene glycol (770 g), sorbitan monooleate (Nonion OP-80R, product of NOF Corporation) (10 g), and water (10 g) were stirred for two hours at 100° C. After cooling of the mixture, magnesium acetate (100 g) was added thereto, and the resultant mixture was processed by means of a roll mill, to thereby produce a frost-preventive composition.

Example 3

Silica gel microparticles (Aerosil #200, product of Nippon Aerosil Co., Ltd.) (170 g), glycerin (700 g), polyoxyethylene sorbitan monooleate (Nonion OT-221, product of NOF Corporation) (10 g), and magnesium acetate (120 g) were mixed together under stirring, and the mixture was processed by means of a roll mill, to thereby produce a frost-preventive composition.

Example 4

Silica gel microparticles (Aerosil #200, product of Nippon Aerosil Co., Ltd.) (90 g), glycerin (740 g), sorbitan monooleate (Nonion OP-80R, product of NOF Corporation) (10 g), and potassium acetate (160 g) were mixed together under stirring, and the mixture was processed by means of a roll mill, to thereby produce a frost-preventive composition.

Example 5

Silica gel microparticles (Aerosil #200, product of Nippon Aerosil Co., Ltd.) (40 g), glycerin (170 g), polyoxyethylene sorbitan monooleate (Nonion OT-221, product of NOF Corporation) (10 g), water (450 g), and potassium acetate (330 g) were mixed together under stirring, and the mixture was processed by means of a roll mill, to thereby produce a frost-preventive composition.

Example 6

Silica gel microparticles (Aerosil #200, product of Nippon Aerosil Co., Ltd.) (30 g), glycerin (170 g), sorbitan monooleate (Nonion OP-80R, product of NOF Corporation) (10 g), water (470 g), sodium acetate (160 g), and calcium chloride (160 g) were mixed together under stirring, and the mixture was processed by means of a roll mill, to thereby produce a frost-preventive composition.

Example 7

Refined carrageenan (refined carrageenan KS-50, product of Marin Science Co., Ltd.) (5 g) was mixed with water (155 g) for sufficient swelling, and dissolved under heating at 60° C. After cooling of the mixture, glycerin (720 g), polyoxyethylene sorbitan monooleate (Nonion OT-221, product of NOF Corporation) (20 g), and calcium chloride (100 g) were added to the mixture, followed by stirring under heating at 45° C., to thereby produce a frost-preventive composition.

Comparative Example 1

The steps of Example 1 were repeated, except that lithium stearate (80 g) and dioctyl adipate (920 g) were employed, to thereby produce a composition.

Comparative Example 2

The steps of Example 2 were repeated, except that calcium stearate (120 g), mineral oil (Diana Fresia U-56, product of Idemitsu Kosan Co., Ltd.) (770 g), water (10 g), and magnesium acetate (100 g) were employed, to thereby produce a composition.

Comparative Example 3

The steps of Example 4 were repeated, except that silica gel microparticles (Aerosil #200, product of Nippon Aerosil Co., Ltd.) (100 g), glycerin (890 g), and sorbitan monooleate (Nonion OP-80R, product of NOF Corporation) (10 g) were employed, to thereby produce a composition.

Comparative Example 4

The steps of Example 5 were repeated, except that silica gel microparticles (Aerosil #200, product of Nippon Aerosil Co., Ltd.) (50 g), poly($\alpha$-olefin) oil (Lipolube 100, product of Lion Corporation) (850 g), and potassium acetate (100 g) were employed, to thereby produce a composition.

Comparative Example 5

The steps of Example 6 were repeated, except that soybean lecithin (lecithin produced by Ajinomoto Co., Inc.) (100 g), water (400 g), mineral oil (Diana Fresia U-56, product of Idemitsu Kosan Co., Ltd.) (300 g), magnesium acetate (100 g), and potassium acetate (100 g) were employed, to thereby produce a composition.

Comparative Example 6

Glycerin (170 g), water (500 g), and potassium acetate (330 g) were mixed together under stirring until a uniform mixture was formed, to thereby produce a composition.

Appearance and consistency of the compositions of Examples 1 to 7 and Comparative Examples 1 to 6 were evaluated. Frost coverage on an inner wall of a refrigerator onto which each composition had been exposed to a refrigerator atmosphere was also evaluated. Evaluation was performed through the following procedure. Tables 1 and 2 show the results.

(Appearance)

The appearance of the compositions of the Examples and the Comparative Examples was visually observed, to thereby determine whether or not each composition maintained consistency of grease (i.e., in the liquid form).

(Consistency)

By means of a cone penetration tester and through the test method as stipulated in JIS K 2220 5.3, worked penetration of the compositions of the Examples and the Comparative Examples was determined.

(Frost Coverage of an Inner Wall in a Refrigerator after Exposure of the Compositions to a Refrigerator Atmosphere)

Each of the compositions produced in the Examples and the Comparative Examples was applied onto an inner surface of a refrigerator at −40° C. in a coating amount of 1 g/100 cm$^2$. The applied composition was allowed to stand for 12 months. The state of the applied composition and the frosting state during the period were visually observed.

The components shown in Tables 1 and 2 are classified into food, food additive, and non-food as follows.

"Food" includes refined carrageenan;

"Food additive" includes propylene glycol, glycerin, calcium stearate, silica gel microparticles, soybean lecithin, sorbitan monooleate, polyoxyethylene sorbitan monooleate (under assessing by Ministry of Health, Labour and Welfare), sodium acetate, and calcium chloride; and "Non-food" includes diethylene glycol, dioctyl adipate, lithium stearate, magnesium acetate, potassium acetate, mineral oil, and poly($\alpha$-olefin) oil.

TABLE 1

| | | | Examples | | | |
| | | | 1 | 2 | 3 | 4 |
|---|---|---|---|---|---|---|
| Composition (mass %) | Component (a) | Diethylene glycol | 83.0 | — | — | — |
| | | Propylene glycol | — | 77.0 | — | — |
| | | Glycerin | — | — | 70.0 | 74.0 |

TABLE 1-continued

|  |  |  | 1 | 2 | 3 | 4 |
|---|---|---|---|---|---|---|
| | Component (b) | Lithium stearate | 6.5 | — | — | — |
| | | Calcium stearate | — | 11.0 | — | — |
| | | Silica gel microparticles | — | — | 17.0 | 9.0 |
| | | Refined carrageenan | — | — | — | — |
| | Component (c) | Magnesium acetate | 10.0 | 10.0 | 12.0 | — |
| | | Potassium acetate | — | — | — | 16.0 |
| | | Sodium acetate | — | — | — | — |
| | | Calcium chloride | — | — | — | — |
| | Component (d) | Sorbitan monooleate | — | 1.0 | — | 1.0 |
| | | Polyoxyethylene sorbitan monooleate | 0.5 | — | 1.0 | — |
| | | Water | — | 1.0 | — | — |
| Performance evaluation | | Appearance | Grease | Grease | Grease | Grease |
| | | Worked penetration | 340 | 350 | 145 | 315 |
| | | Frosting of refrigerator inner walls after exposure of each composition to refrigerator atmosphere | No frosting 12 months after | No frosting 12 months after | No frosting 12 months after | No frosting 12 months after |

|  |  |  | Examples | | |
|---|---|---|---|---|---|
|  |  |  | 5 | 6 | 7 |
| Composition (mass %) | Component (a) | Diethylene glycol | — | — | — |
| | | Propylene glycol | — | — | — |
| | | Glycerin | 17.0 | 17.0 | 72.0 |
| | Component (b) | Lithium stearate | — | — | — |
| | | Calcium stearate | — | — | — |
| | | Silica gel microparticles | 4.0 | 3.0 | — |
| | | Refined carrageenan | — | — | 0.5 |
| | Component (c) | Magnesium acetate | — | — | — |
| | | Potassium acetate | 33.0 | — | — |
| | | Sodium acetate | — | 16.0 | — |
| | | Calcium chloride | — | 16.0 | 10.0 |
| | Component (d) | Sorbitan monooleate | — | 1.0 | — |
| | | Polyoxyethylene sorbitan monooleate | 1.0 | — | 2.0 |
| | | Water | 45.0 | 47.0 | 15.5 |
| Performance evaluation | | Appearance | Grease | Grease | Grease |
| | | Worked penetration | 420 | 390 | 455 |
| | | Frosting of refrigerator inner walls after exposure of each composition to refrigerator atmosphere | No frosting 12 months after | No frosting 12 months after | No frosting 12 months after |

TABLE 2

|  |  |  | Comparative Examples | | |
|---|---|---|---|---|---|
|  |  |  | 1 | 2 | 3 |
| Composition (mass %) | Component (a) | Mineral oil | — | 77.0 | — |
| | | Poly(α-olefin) oil | — | — | — |
| | | Dioctyl adipate | 92.0 | — | — |
| | | Propylene glycol | — | — | — |
| | | Glycerin | — | — | 89.0 |
| | Component (b) | Lithium stearate | 8.0 | — | — |
| | | Calcium stearate | — | 12.0 | — |
| | | Silica gel microparticles | — | — | 10.0 |
| | | Soybean lecithin | — | — | — |
| | Component (c) | Magnesium acetate | — | 10.0 | — |
| | | Potassium acetate | — | — | — |
| | Component (d) | Sorbitan monooleate | — | — | 1.0 |
| | | Water | — | 1.0 | — |
| Performance evaluation | | Appearance | Grease | Grease | Grease |
| | | Worked penetration | 290 | 340 | 300 |
| | | Frosting of refrigerator inner walls after exposure of each composition to refrigerator atmosphere | Frosting 1 month after | Frosting 1 month after | Frosting 1 month after |

TABLE 2-continued

|  |  |  | Comparative Examples | | |
|---|---|---|---|---|---|
|  |  |  | 4 | 5 | 6 |
| Composition (mass %) | Component (a) | Mineral oil | — | 30.0 | — |
|  |  | Poly(α-olefin) oil | 85.0 | — | — |
|  |  | Dioctyl adipate | — | — | — |
|  |  | Propylene glycol | — | — | — |
|  |  | Glycerin | — | — | 17.0 |
|  | Component (b) | Lithium stearate | — | — | — |
|  |  | Calcium stearate | — | — | — |
|  |  | Silica gel microparticles | 5.0 | — | — |
|  |  | Soybean lecithin | — | 10.0 | — |
|  | Component (c) | Magnesium acetate | — | 10.0 | — |
|  |  | Potassium acetate | 10.0 | 10.0 | 33.0 |
|  | Component (d) | Sorbitan monooleate | — | — | — |
|  |  | Water | — | 40.0 | 50.0 |
| Performance evaluation |  | Appearance | Grease | Liquid | Liquid |
|  |  | Worked penetration | 400 | Not measurable | Not measurable |
|  |  | Frosting of refrigerator inner walls after exposure of each composition to refrigerator atmosphere | Frosting 1 month after | Composition falling 1 week after | Composition falling 1 week after |

Example 8

Silica gel microparticles (Aerosil #200, product of Nippon Aerosil Co., Ltd.) (40 g), glycerin (170 g), polyoxyethylene sorbitan monooleate (Nonion OT-221, product of NOF Corporation) (10 g), water (450 g), and tripotassium citrate monohydrate (330 g) were mixed together under stirring, and the mixture was processed by means of a roll mill, to thereby produce a frost-preventive composition.

A refrigerator (GR-W10A, product of TOSHIBA CORPORATION) was placed in a thermostat/hygrostat chamber at 25° C. and a relative humidity of 50%. On five inner walls (excluding the inside wall of the door) of a freezing compartment of the refrigerator, each of the frost-preventive compositions produced in the aforementioned Examples and Comparative Examples was applied in a uniform thickness (coating amount: about 40 g). Two 300-mL beakers each containing ion-exchange water (250 g) and a thermometer were placed in the freezing compartment, and the refrigerator was plugged in via a small wattmeter (Watt-hour-meter, SHW3A, product of System Art Ware), while the temperature control switch was positioned to "strong." Electric power consumption during a period from the start to 840 hours after plugging in was determined. The total electric power consumption was 61.2 kw, and the temperature inside the freezing compartment (hour 840) was −31° C. No frosting on the inner walls was observed.

Example 9

Silica gel microparticles (Aerosil #200, product of Nippon Aerosil Co., Ltd.) (40 g), glycerin (170 g), sorbitan monooleate (Nonion OP-80R, product of NOF Corporation) (10 g), water (450 g), and sodium nitrate (330 g) were mixed together under stirring, and the mixture was processed by means of a roll mill, to thereby produce a frost-preventive composition.

The thus-produced frost-preventive composition was tested in a manner similar to that of Example 8. Specifically, electric power consumption during a period from the start to 840 hours after plugging in was determined. The total electric power consumption was 62.4 kW, and the temperature inside the freezing compartment (hour 840) was −29° C. No frosting on the inner walls was observed.

Example 10

Silica gel microparticles (Aerosil #200, product of Nippon Aerosil Co., Ltd.) (40 g), glycerin (170 g), polyoxyethylene hydrogenated castor oil (Uniox HC-40, product of NOF Corporation) (10 g), water (450 g), and dipotassium hydrogenphosphate (330 g) were mixed together under stirring, and the mixture was processed by means of a roll mill, to thereby produce a frost-preventive composition.

The thus-produced frost-preventive composition was tested in a manner similar to that of Example 8. Specifically, electric power consumption during a period from the start to 840 hours after plugging in was determined. The total electric power consumption was 61.9 kW, and the temperature inside the freezing compartment (hour 840) was −29° C. No frosting on the inner walls was observed.

Comparative Example 7

The test procedure of Example 8 was repeated, except that no frost-preventive composition was applied. Specifically, two 300-mL beakers each containing including ion-exchange water (250 g) and a thermometer were placed in the freezing compartment of the refrigerator, and the refrigerator was plugged in via the small wattmeter as employed in Example 8, while the temperature control switch was positioned to "strong." Electric power consumption during a period from the start to 840 hours after plugging in was determined. The total electric power consumption was 67.2 kW, and the temperature inside the freezing compartment (hour 840) was −24° C. The inner walls were covered with frost, which was firmly adhered on the walls. The frost was difficult to remove.

The aforementioned test of the compositions of Examples 1 to 10 and the Comparative Examples 1 to 7 has revealed that the compositions of the present invention containing components (a) to (c) maintain high frost prevention effect for a long period of time. The test has also revealed that addition of the component (d) enhances the effect of maintaining grease consistency.

In Comparative Example 7 in which no frost-preventive composition was applied, frosting of the inner walls of the freezing compartment was observed. However, when each of the frost-preventive compositions of Examples 8 to 10 was applied, no frosting of the inner walls of the freezing compartment was observed. In addition, through application of the frost-preventive composition of the present invention, total electric power consumption was reduced, as compared with the Comparative Examples. Therefore, the composition of the present invention is useful from the viewpoint of saving of energy.

INDUSTRIAL APPLICABILITY

The frost-preventive composition of the present invention defrosts and melts ice and prevents adhesion of frost, snow, and ice, or considerably reduces the amount thereof. Therefore, the composition of the invention can be suitably employed in a refrigerating storehouse, a reefer container, a cooling apparatus, etc. The composition may also be applicable to melting snow and anti-freezing applications in buildings, outdoor advertising panels, cable, automobiles, train cars, aircraft, ships, ship equipment, fishing equipment, heavy machinery for construction, power generation plants, railway facilities, port facilities, aviation facilities, marks and safety parts therefor, and natural resource mining fields in cold regions such as oil fields and mines.

When the composition of the invention is applied to a heat-exchange surface of a cooling apparatus or the like, electric power consumption decreases, whereby the environmental load can be reduced by virtue of saving of energy.

Furthermore, the frost-preventive composition of the present invention may be used as a lubricating grease for low temperature use which grease also exhibits anti-freezing effect. For example, the composition may be applied to a ski lift or a ski gondola. When component substances which are allowed to be used as food or a food additive are employed, the composition may be used without any health-related risk in a food freezing compartment or the like wherein the composition possibly comes in direct contact with food.

The invention claimed is:

1. A frost-preventive greasy composition, comprising:
   (a) 10.0 to 96.7 mass % of at least one species selected from the group consisting of a glycol, a glycol ether, a polyalkylene glycol, a polyalkylene glycol derivative, glycerin, and a glycerin derivative,
   (b) 0.3 to 25.0 mass % of at least one species selected from the group consisting of a soap, a urea compound, silica gel microparticles, lecithin, and a polysaccharide,
   (c) 3.0 to 89.7 mass % of at least one metal salt selected from the group consisting of a metal carboxylate, a metal phosphate, a metal nitrate, a metal chloride, and a metal bromide, and
   (d) at least one species selected from the group consisting of a sorbitan fatty acid ester, a polyoxyalkylene sorbitan fatty acid ester, a polyoxyalkylene alkyl ether, castor oil, hydrogenated castor oil, a polyoxyalkylene castor oil, and a polyoxyalkylene hydrogenated castor oil, wherein the amount of the component (d) is 0.1 to 5.2 parts by mass with respect to the total amount of the components (a), (b), and (c) being 100 parts by mass.

2. The frost-preventive composition as described in claim 1, wherein the component (a) is at least one species selected from the group consisting of an alkylene glycol, an alkylene glycol oligomer, and glycerin.

3. The frost-preventive composition as described in claim 1, wherein the component (a) is at least one species selected from the group consisting of diethylene glycol, propylene glycol, and glycerin.

4. The frost-preventive composition as described in claim 1, wherein the component (b) is at least one species selected from the group consisting of a C16 to C22 fatty acid metal salt, silica gel microparticles, lecithin, and a polysaccharide.

5. The frost-preventive composition as described in claim 1, wherein the component (c) is at least one species selected from the group consisting of a metal carboxylate, a metal phosphate, and a metal chloride.

6. The frost-preventive composition as described in claim 1, wherein the component (d) is at least one species selected from the group consisting of a sorbitan fatty acid ester, a polyoxyalkylene sorbitan fatty acid ester, and a polyoxyalkylene hydrogenated castor oil.

7. The frost-preventive composition as described in claim 2, wherein the component (a) is at least one species selected from the group consisting of diethylene glycol, propylene glycol, and glycerin.

8. The frost-preventive composition as described in claim 7, wherein the component (b) is at least one species selected from the group consisting of a C16 to C22 fatty acid metal salt, silica gel microparticles, lecithin, and a polysaccharide.

9. The frost-preventive composition as described in claim 8, wherein the component (c) is at least one species selected from the group consisting of a metal carboxylate, a metal phosphate, and a metal chloride.

10. The frost-preventive composition as described in claim 9, wherein the component (d) is at least one species selected from the group consisting of a sorbitan fatty acid ester, a polyoxyalkylene sorbitan fatty acid ester, and a polyoxyalkylene hydrogenated castor oil.

* * * * *